(12) United States Patent
Kato et al.

(10) Patent No.: US 9,758,151 B2
(45) Date of Patent: Sep. 12, 2017

(54) HYBRID VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Shunya Kato, Toyota (JP); Yosuke Tagawa, Toyota (JP); Hideki Furuta, Anjo (JP)

(73) Assignees: Toyota Jidosha Kabushiki Kaisha, Toyota-shi, Aichi-ken (JP); Aisin AW Co., Ltd., Anjo-shi, Aichi-ken (JP)

( * ) Notice: Subject to any disclaimer, the term of this patent is extended or adjusted under 35 U.S.C. 154(b) by 90 days.

(21) Appl. No.: 14/714,392

(22) Filed: May 18, 2015

(65) Prior Publication Data
US 2015/0344020 A1   Dec. 3, 2015

(30) Foreign Application Priority Data

May 28, 2014   (JP) ................................. 2014-110322

(51) Int. Cl.
| | |
|---|---|
| B60W 20/00 | (2016.01) |
| B60W 20/10 | (2016.01) |
| B60W 10/02 | (2006.01) |
| B60K 6/44 | (2007.10) |
| B60K 6/365 | (2007.10) |

(Continued)

(52) U.S. Cl.
CPC ............. B60W 20/10 (2013.01); B60K 6/365 (2013.01); B60K 6/44 (2013.01); B60K 6/445 (2013.01); B60W 10/02 (2013.01); B60W 10/06 (2013.01); B60W 10/08 (2013.01); B60W 10/10 (2013.01); B60W 2520/12 (2013.01); B60W 2540/10 (2013.01); B60W 2540/12 (2013.01); B60W 2540/16 (2013.01); B60W 2710/021 (2013.01); B60W 2710/0644 (2013.01);

(Continued)

(58) Field of Classification Search
CPC ...... B60W 10/00; B60W 10/02; B60W 10/04; B60W 10/08; B60W 20/00; B60W 20/04
See application file for complete search history.

(56) References Cited

U.S. PATENT DOCUMENTS 7,530,920 B2 * 5/2009 Matsubara ............. B60K 6/445
477/3
8,277,360 B2 * 10/2012 Matsubara ............. B60K 6/365
475/5

(Continued)

FOREIGN PATENT DOCUMENTS

JP      2010-149538      7/2010

*Primary Examiner* — Redhwan K Mawari
*Assistant Examiner* — Michael Whalen
(74) *Attorney, Agent, or Firm* — Finnegan, Henderson, Farabow, Garrett & Dunner, LLP

(57) ABSTRACT

In response to a DN operation that changes a shift position SP from a D position to an N position during forward drive in an HV drive mode, then an accelerator position Acc is not less than a reference accelerator position Aref (step S130), a mechanical neutral control is performed to provide a neutral state by releasing transmission of power between an intermediate shaft 32 and a driveshaft 36 by a multi-speed transmission 60 (step S230). An engine and two motors are then controlled to be rotated at rotation speeds close to rotation speeds Nedn, Nm1dn and Nm2dn at the time of DN operation (steps S250, S270 and S280).

8 Claims, 10 Drawing Sheets

(51) Int. Cl.
    *B60W 10/06* (2006.01)
    *B60W 10/08* (2006.01)
    *B60W 10/10* (2012.01)
    *B60K 6/445* (2007.10)

(52) U.S. Cl.
    CPC .............. *B60W 2710/081* (2013.01); *B60W 2710/1038* (2013.01); *Y10S 903/93* (2013.01)

(56) References Cited

U.S. PATENT DOCUMENTS

| | | | | |
|---|---|---|---|---|
| 2007/0093341 | A1* | 4/2007 | Supina | B60K 6/365 |
| | | | | 475/5 |
| 2007/0099748 | A1* | 5/2007 | Matsubara | B60K 6/365 |
| | | | | 477/3 |
| 2009/0082171 | A1* | 3/2009 | Conlon | B60K 6/365 |
| | | | | 477/5 |
| 2016/0068053 | A1* | 3/2016 | True | B60K 6/442 |
| | | | | 180/242 |

\* cited by examiner

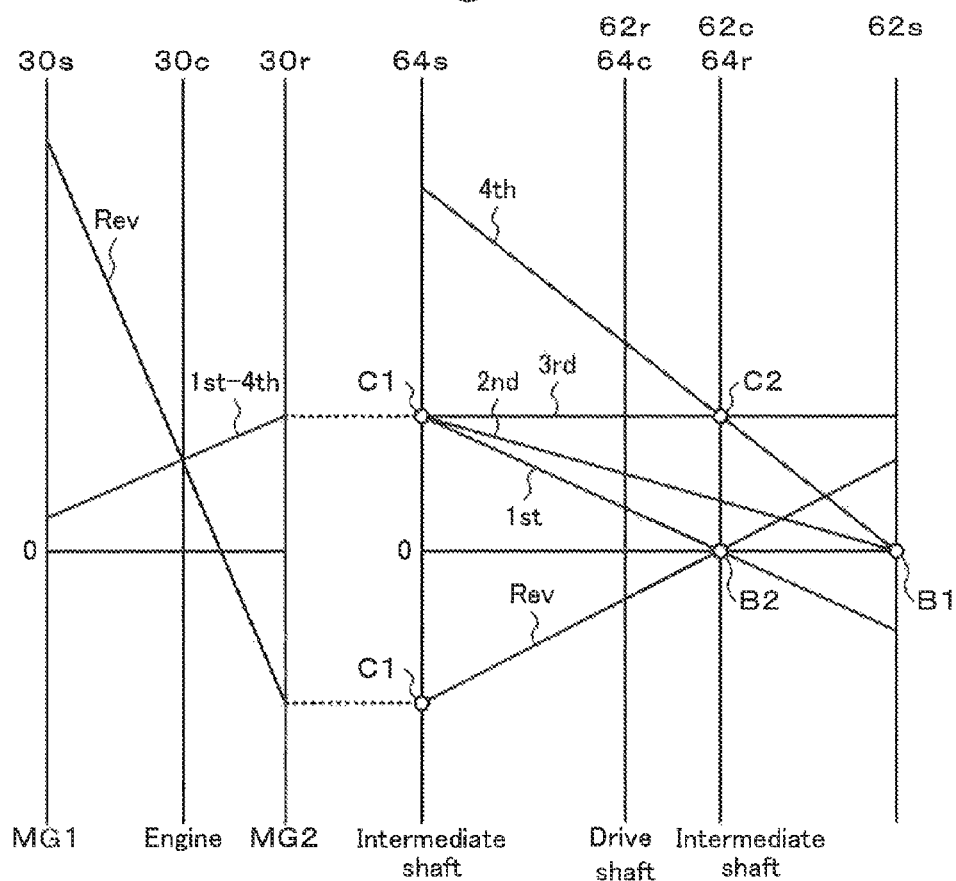

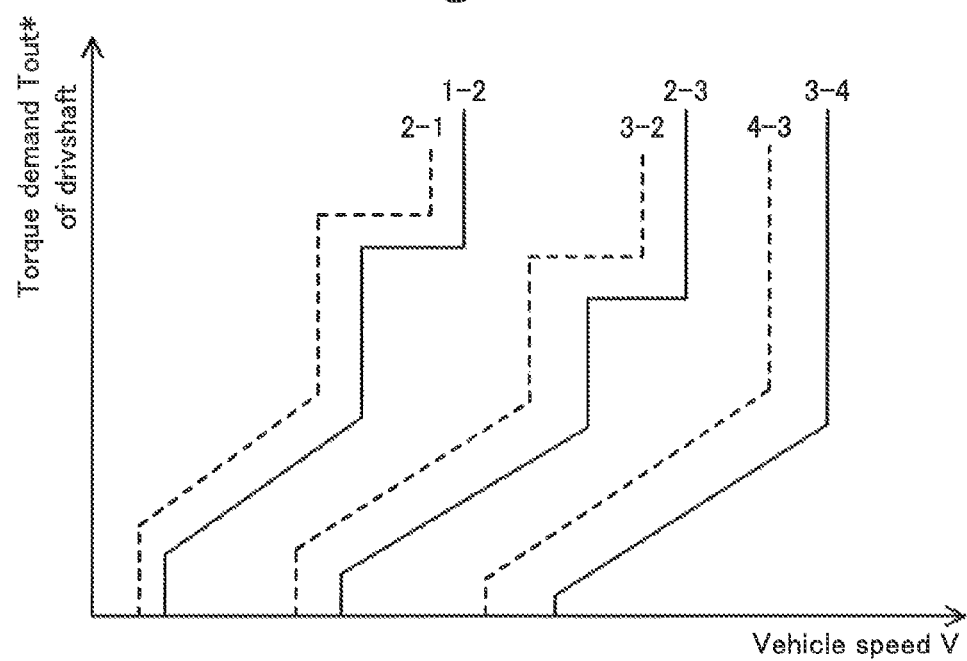

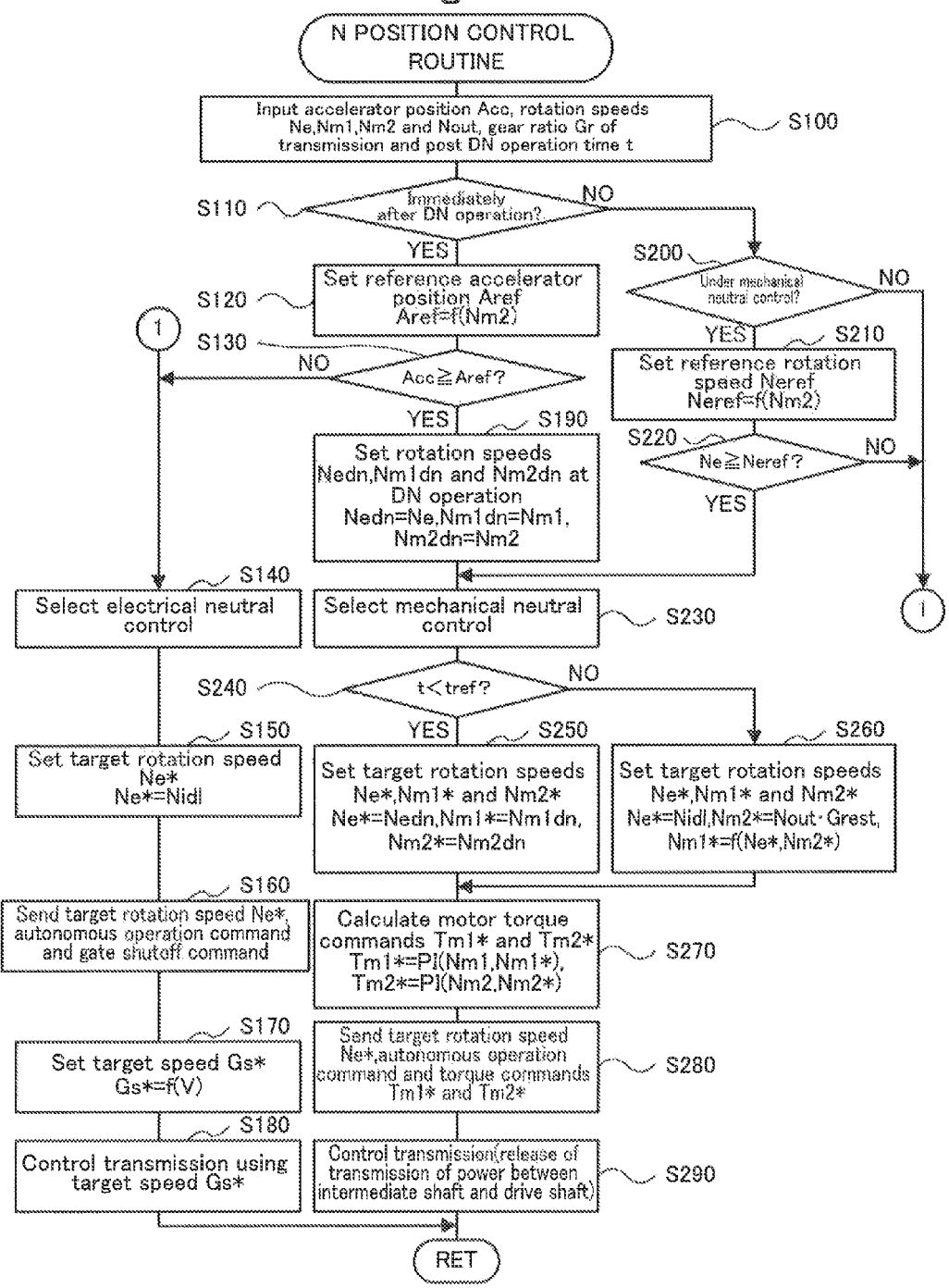

HYBRID VEHICLE

TECHNICAL FIELD

The present invention relates to a hybrid vehicle. More specifically, the present invention relates to a hybrid vehicle including an engine configured to output power to an intermediate shaft, a motor configured to input and output power from and to the intermediate shaft, an inverter configured to drive the motor; a battery configured to transmit electric power to and from the motor via the inverter, and a power transmission assembly configured to mechanically transmit power between the intermediate shaft and a driveshaft linked with an axle and mechanically release the transmission of power.

BACKGROUND ART

A proposed configuration of a hybrid vehicle includes an engine, a first motor, a power distribution mechanism having a ring gear, a carrier and a sun gear respectively connected with a transmission member, the engine and the first motor, a second motor connected with the transmission member, inverters arranged to drive the first motor and the second motor, a power storage device (battery) charged and discharged to transmit electric power to and from the first motor and the second motor via the inverters, and an automatic transmission (multi-speed transmission) placed between the transmission member and drive wheels. In this proposed configuration, when a shift lever is set in a non-drive position, the first motor is controlled to be in a non-load state (for example, JP 2010-149538A). This hybrid vehicle performs control to set the first motor in the non-load state when the shift lever is at the non-drive position and does not release the connection between the transmission member and the drive wheels by the automatic transmission, so as to enhance the output responsiveness to the drive wheels in response to a subsequent operation of the shift lever to a drive position.

CITATION LIST

Patent Literature

PTL 1: JP 2010-149538

SUMMARY OF INVENTION

Technical Problem

The hybrid vehicle of this configuration controls the engine to be autonomously operated or stops the operation of the engine when the shift position is set to a neutral position. When the shift lever is operated to change the shift position from the drive position to the neutral position during drive with output of power (torque) from the engine, the engine power is expected to remain to some extent immediately after the shift change. Controlling the first motor to the non-load state prevents the rotation speed of the engine from being controlled by the first motor. According to the magnitude of the power of the engine, there is a likelihood that the engine or the first motor has overspeed due to racing of the engine.

The hybrid vehicle of the invention is mainly directed to suppress overspeed of an engine or a motor when a shift position is changed from a drive position to a neutral position.

Solution to Problem

In order to achieve the main object described above, there are provided a hybrid vehicle of the following aspects.

The present invention is directed to a hybrid vehicle. The hybrid vehicle includes: an engine configured to output power to an intermediate shaft, a motor configured to input and output power from and to the intermediate shaft, an inverter configured to drive the motor, a battery configured to transmit electric power to and from the motor via the inverter, and a power transmission assembly configured to mechanically transmit power between the intermediate shaft and a driveshaft linked with an axle and mechanically release the transmission of power. The hybrid vehicle further includes a controller configured to perform at least one of an electrical neutral control that provides a neutral state by shutting off a gate of the inverter and a mechanical neutral control that provides the neutral state by releasing the transmission of the power between the intermediate shaft and the driveshaft by the power transmission assembly, at a shift position set to a neutral position. In response to a neutral operation that changes the shift position from a drive position to the neutral position, the controller performs the mechanical neutral control when a parameter relating to output of the engine is equal to or greater than a reference value, while performing the electrical neutral control when the parameter is less than the reference value.

When the shift position is set to the neutral position, the hybrid vehicle of this aspect performs at least one of the electrical neutral control that provides the neutral state by shutting off the gate of the inverter and the mechanical neutral control that provides the neutral state by releasing the transmission of power between the intermediate shaft and the driveshaft by the power transmission assembly. In response to the neutral operation that changes the shift position from the drive position to the neutral position, the hybrid vehicle of this aspect performs the mechanical neutral control when the parameter relating to output of the engine is not less than the reference value, while performing the electrical neutral control when the parameter is less than the reference value. The "parameter relating to output of the engine" may be, for example, an accelerator position, a torque demand of the driveshaft or a torque demand of the intermediate shaft based on the accelerator position, a power demand of the driveshaft or a power demand of the intermediate shaft based on the torque demand of the drive shaft or the intermediate shaft, a power demand of the engine based on the power demand of the drive shaft or the intermediate shaft, a torque or a power output from the engine, or the amount of intake air or the amount of fuel injection of the engine. The parameter and the output of the engine have a relationship such that the output of the engine increases with an increase of the parameter or the parameter increases with an increase of the output of the engine. The hybrid vehicle of this aspect performs the mechanical neutral control when the parameter is not less than the reference value. Controlling the engine and the motor to suppress an increase in rotation speed of the engine or an increase in rotation speed of the motor without shutting off the gate of the inverter suppresses overspeed of the engine or the motor. The hybrid vehicle of this aspect performs the electrical neutral control when the parameter is less than the reference value. Setting the power transmission assembly in the state that allows for transmission of power between the intermediate shaft and the driveshaft enables the power to be output to the driveshaft by simply resuming control of the inverter (terminating the shutoff of the gate). This enhances the output responsiveness to the driveshaft in response to a subsequent change of the shift position to the drive position.

In the hybrid vehicle according to the present invention, when a rotation speed of the engine decreases to or below a reference rotation speed during the mechanical neutral control performed in response to the neutral operation, the controller may change control from the mechanical neutral control to the electrical neutral control. This makes the power transmission assembly in the state that allows for transmission of power between the intermediate shaft and the driveshaft, after a change to the electrical neutral control. This enhances the output responsiveness to the driveshaft in a subsequent change of the shift position to the drive position.

The hybrid vehicle according to the present invention may further include a planetary gear configured to have three rotational elements respectively connected with an output shaft of the engine, a rotating shaft of the motor and the intermediate shaft, a second motor configured to input and output power from and to the driveshaft, and a second inverter configured to drive the second motor. The battery may be configured to transmit electric power to and from the motor via the inverter and transmit electric power to and from the second motor via the second inverter, and the controller may perform the electrical neutral control to provide the neutral state by shutting off the gate of the inverter and a gate of the second inverter.

In the hybrid vehicle of the above aspect having the planetary gear, the second motor and the second inverter in addition to the engine, the motor, the inverter and the battery, the reference value may be set to decrease with a decrease in rotation speed of the intermediate shaft. This takes into account that the rotation speed of the motor increases with a decrease in rotation speed of the intermediate shaft (in other words, the motor is likely to have overspeed) when the engine is connected with the planetary gear such that the engine is located between the motor and the intermediate shaft in a collinear diagram of the engine, the motor and the intermediate shaft.

Further, in the hybrid vehicle of the above aspect having the planetary gear, the second motor and the second inverter in addition to the engine, the motor, the inverter and the battery, when a rotation speed of the engine decreases to or below a reference rotation speed during the mechanical neutral control performed in response to the neutral operation, the controller may change control from the mechanical neutral control to the electrical neutral control, and the reference rotation speed may be set to decrease with a decrease in rotation speed of the intermediate shaft. This takes into account that the rotation speed of the motor increases with a decrease in rotation speed of the intermediate shaft when the engine is connected with the planetary gear such that the engine is located between the motor and the intermediate shaft in the collinear diagram of the engine, the motor and the intermediate shaft.

In the hybrid vehicle according to the present invention, the controller may perform the mechanical neutral control to control the engine and the motor to be driven at rotation speeds at a time of the neutral operation. This suppresses overspeed of the engine or the motor during the mechanical neutral control. In this case, after elapse of a predetermined time since start of the mechanical neutral control, the controller may perform control to rotate the engine at an idle rotation speed and make a rotation speed of the intermediate shaft approach a rotation speed estimated in a state that allows for transmission of power between the intermediate shaft and the driveshaft by the power transmission assembly.

This reduces a potential shock when the power transmission assembly is set in the state that allows for transmission of power between the intermediate shaft and the drive shaft, for example, at a change from the mechanical neutral control to the electrical neutral control or a change of the shift position to a drive position.

Further, in the hybrid vehicle according to the present invention, the power transmission assembly may include a multi-speed transmission configured to have engagement elements and placed between the intermediate shaft and the driveshaft. Further, the power transmission assembly may be a clutch placed between the intermediate shaft and the driveshaft. The power transmission assembly may further include a forward-reverse changeover mechanism having engagement elements and a continuously variable transmission, which are placed between the intermediate shaft and the driveshaft.

BRIEF DESCRIPTION OF DRAWINGS

FIG. 3 is a diagram illustrating one exemplary collinear diagram showing the relationship between the rotation speeds of the respective rotational elements of a planetary gear and a multi-speed transmission;

FIG. 4 is an operation table showing the relationship between the respective speeds of the multi-speed transmission and the operating conditions of clutches and brakes;

FIG. 5 is one example of a change speed map;

FIG. 6 is a flowchart showing one example of N position control routine performed by HVECU of the embodiment;

DESCRIPTION OF EMBODIMENTS

The following describes aspects of the invention with referring to some embodiments.

Figure 1:
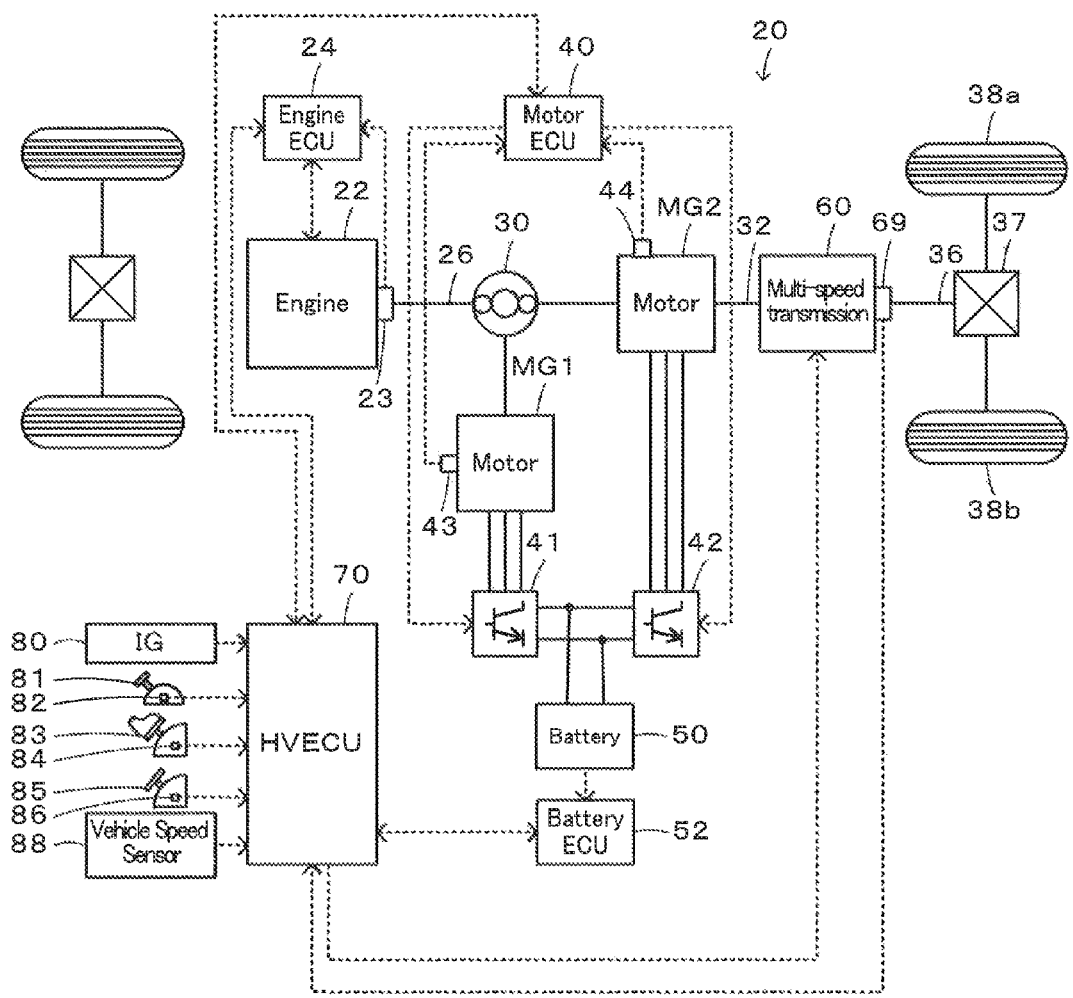
FIG. 1 is a configuration diagram illustrating the schematic configuration of a hybrid vehicle according to one embodiment of the invention.
Figure 2:
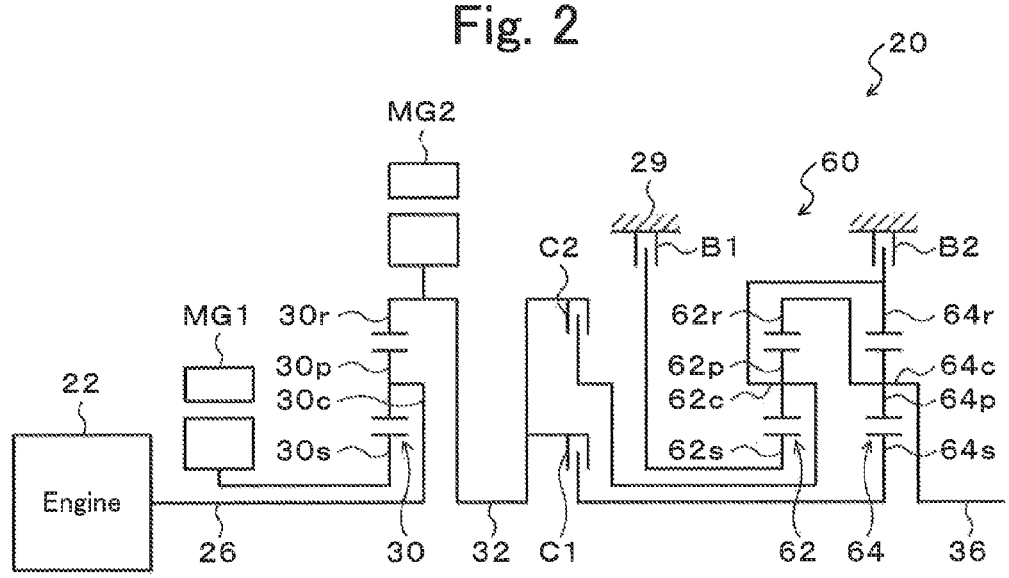
FIG. 2 is a connection relationship diagram illustrating the connection relationship of respective components of the hybrid vehicle.

FIG. 1 is a configuration diagram illustrating the schematic configuration of a hybrid vehicle 20 according to one embodiment of the invention. FIG. 2 is a connection relationship diagram illustrating the connection relationship of respective components of the hybrid vehicle 20. As shown in FIGS. 1 and 2, the hybrid vehicle 20 of the embodiment includes an engine 22 configured to output power by using, for example, gasoline or light oil as the fuel; a motor MG1 provided as, for example, a synchronous motor generator; a planetary gear 30 connected with a crankshaft 26 of an engine 22, a rotor (rotating shaft) of a motor MG1 and an intermediate shaft 32; a motor MG2 provided as, for example, a synchronous motor generator and configured to have a rotor (rotating shaft) connected with the intermediate shaft 32; a multi-speed transmission 60 configured to make the power of the intermediate shaft 32 subjected to gear change and transmit the power after the gear change to a driveshaft 36 linked with drive wheels 38a and 38b via a differential gear 37; inverters 41 and 42 operated to drive the motors MG1 and MG2; a battery 50 provided as, for example, a lithium ion secondary battery and configured to transmit electric power to and from the motors MG1 and MG2 via the inverters 41 and 42; an engine electronic control unit (hereinafter referred to as "engine ECU") 24 configured to drive and control the engine 22; a motor electronic control unit (hereinafter referred to as "motor ECU") 40 configured to drive and control the motors MG1 and MG2 by switching control of switching elements (not shown) of the inverters 41 and 42; a battery electronic control unit (hereinafter referred to as "battery ECU") 52 configured to manage the battery 50; and a hybrid electronic control unit (hereinafter referred to as "HVECU") 70 configured to drive and control the multi-speed transmission 60 and control the entire vehicle. In the description below, the upstream side of the multi-speed transmission 60 including the engine 22, the planetary gear 30, the motors MG1 and MG2, the inverters 41 and 42 and the battery 50 is called "hybrid assembly".

The planetary gear 30 includes a sun gear 30s as an external gear, a ring gear 30r as an internal gear arranged coaxially with the sun gear 30s, a plurality of pinion gears 30p arranged to be respectively engaged with the sun gear 30s and the ring gear 30r, and a carrier 30c arranged to hold the plurality of pinion gears 30p such as to be rotatable on their own axes and allow the pinion gears 30p to revolve around the carrier 30c. The sun gear 30s is connected with the rotor of the motor MG1. The ring gear 30r is connected with the intermediate shaft 32 (input shaft of the multi-speed transmission 60). The carrier 30c is connected with the crankshaft 26 of the engine 22.

The multi-speed transmission 60 is configured as a four-speed transmission to make the power of the intermediate shaft 32 (input shaft of the multi-speed transmission 60) subjected to gear change in four speeds and transmit the power after the gear change to the driveshaft 36 (output shaft of the multi-speed transmission 60) and release the power transmission between the intermediate shaft 32 and the driveshaft 36. As shown in FIG. 2, the multi-speed transmission 60 includes two single pinion-type planetary gears 62 and 64 and two clutches C1 and C2 and two brakes B1 and B2 provided as a plurality of engagement elements.

The planetary gear 62 includes a sun gear 62s as an external gear, a ring gear 62r as an internal gear arranged coaxially with the sun gear 62s, a plurality of pinion gears 62p arranged to be respectively engaged with the sun gear 62s and the ring gear 62r, and a carrier 62c arranged to hold the plurality of pinion gears 62p such as to be rotatable on their own axes and allow the pinion gears 62p to revolve around the carrier 62c.

The planetary gear 64 includes a sun gear 64s as an external gear, a ring gear 64r as an internal gear arranged coaxially with the sun gear 64s, a plurality of pinion gears 64p arranged to be respectively engaged with the sun gear 64s and the ring gear 64r, and a carrier 64c arranged to hold the plurality of pinion gears 64p such as to be rotatable on their own axes and allow the pinion gears 64p to revolve around the carrier 64c.

The carrier 62c of the planetary gear 62 is connected with (fixed to) the ring gear 64r of the planetary gear 64, and the ring gear 62r of the planetary gear 62 is connected with the carrier 64c of the planetary gear 64. Accordingly, the planetary gear 62 and the planetary gear 64 serve as a four element-type mechanism having the sun gear 62s of the planetary gear 62, the carrier 62c of the planetary gear 62 with the ring gear 64r of the planetary gear 64, the ring gear 62r of the planetary gear 62 with the carrier 64c of the planetary gear 64 and the sun gear 64s of the planetary gear 64 as the four rotational elements. The ring gear 62r of the planetary gear 62 and the carrier 64c of the planetary gear 64 are linked with the driveshaft 36 (output shaft of the multi-speed transmission 60).

The clutch C1 is operated to connect the intermediate shaft 32 with the sun gear 64s and the planetary gear 64 and disconnect the intermediate shaft 32 from the sun gear 64s. The clutch C2 is operated to connect the intermediate shaft 32 with the carrier 62c of the planetary gear 62 and the ring gear 64r of the planetary gear 64 and disconnect the intermediate shaft 32 from the carrier 62c and the ring gear 64r. The brake B1 is operated to fix (connect) the sun gear 62s of the planetary gear 62 to a transmission casing 29 as a stationary member to be non-rotatable and release the sun gear 62s from the transmission case 29 to be rotatable. The brake B2 is operated to fix (connect) the carrier 62c of the planetary gear 62 and the ring gear 64r of the planetary gear 64 to the transmission casing 29 to be non-rotatable and release the carrier 62c and the ring gear 64r from the transmission casing 29 to be rotatable. The clutches C1 and C2 and the brakes B1 and B2 are operated with supply and discharge of operating oil by a hydraulic control device (not shown).

FIG. 3 is a diagram illustrating one exemplary collinear diagram showing the relationship between the rotation speeds of the respective rotational elements of the planetary gear 30 and the multi-speed transmission 60. FIG. 4 is an operation table showing the relationship between the respective speeds of the multi-speed transmission 60 and the operating conditions of the clutches C1 and C2 and the brakes B1 and B2. The multi-speed transmission 60 provides a forward first speed and reverse speed by engagement of the clutch C1 and the brake B2 and release of the clutch C2 and the brake B2, a forward second speed by engagement of the clutch C1 and the brake B1 and release of the clutch C2 and the brake B2, a forward third speed by engagement of the clutch C1 and the clutch C2 and release of the brakes B1 and B2, and a forward fourth speed by engagement of the clutch C2 and the brake B1 and release of the clutch C1 and the brake B2. The multi-speed transmission 60 also provides a neutral state by engagement of one of the clutches C1 and C2 and the brakes B1 and B2 and release of the other three components (so as to release transmission of the power between the intermediate shaft 32 and the driveshaft 36).

The engine ECU 24 is actualized by a CPU-based microprocessor, although not being specifically illustrated. The engine ECU 24 includes a ROM configured to store processing programs, a RAM configured to store data temporarily, input/output ports and a communication port, in addition to the CPU. The engine ECU 24 inputs, via the input port, signals from various sensors required for operating and controlling the engine 22 and outputs, via the output port, various control signals for operating and controlling the engine 22. The engine ECU 24 calculates a rotation speed Ne of the engine 22, based on a signal from a crank position sensor 23 attached to the crankshaft 26 of the engine 22.

The motor ECU 40 is actualized by a CPU-based microprocessor, although not being specifically illustrated. The motor ECU 40 includes a ROM configured to store processing programs, a RAM configured to store data temporarily, input/output ports and a communication port, in addition to the CPU. The motor ECU 40 inputs, via the input port, signals from various sensors required for driving and controlling the motors MG1 and MG2 and outputs, via the output port, for example, switching control signals to the switching elements (not shown) of the inverters 41 and 42. The motor ECU 40 calculates rotation speeds Nm1 and Nm2 of the motors MG1 and MG2, based on rotational positions $\theta$m1 and $\theta$m2 of the rotors of the motors MG1 and MG2 from rotational position detection sensors 43 and 44 configured to detect the rotational positions of the rotors of the motors MG1 and MG2.

The battery ECU 52 is actualized by a CPU-based microprocessor, although not being specifically illustrated. The battery ECU 52 includes a ROM configured to store processing programs, a RAM configured to store data temporarily, input/output ports and a communication port, in addition to the CPU. The battery ECU 52 inputs, via the input port, signals from various sensors required for managing the battery 50. The battery ECU 52 calculates a state of charge SOC which is the ratio of the capacity of dischargeable electric power from the battery 50 to the full capacity, based on an integrated value of charge-discharge current Ib of the battery 50 detected by a current sensor (not shown) and calculates an input limit Win and an output limit Wout which respectively denote allowable input electric power to charge the battery 50 and allowable output electric power to be discharged from the battery 50, based on the calculated state of charge SOC and a battery temperature Tb.

The HVECU 70 is actualized by a CPU-based microprocessor, although not being specifically illustrated. The HVECU 70 includes a ROM configured to store processing programs, a RAM configured to store data temporarily, input/output ports and a communication port, in addition to the CPU. The HVECU 70 inputs, via the input port, for example, a rotation speed Nout of the driveshaft 36 from a rotation speed sensor 69 configured to detect the rotation speed of the driveshaft 36, an ignition signal from an ignition switch 80, a shift position SP from a shift position sensor 82 configured to detect the operational position of a shift lever 81, an accelerator position Acc from an accelerator pedal position sensor 84 configured to detect the depression amount of an accelerator pedal 83, a brake pedal position BP from a brake pedal position sensor 86 configured to detect the depression amount of a brake pedal 85 and a vehicle speed V from a vehicle speed sensor 88. The HVECU 70 outputs, via the output port, for example, control signals to the multi-speed transmission 60 (hydraulic control device). The HVECU 70 is connected to be communicable with the engine ECU 24, the motor ECU 40 and the battery ECU 52 and transmits various control signals and data to and from the engine ECU 24, the motor ECU 40 and the battery ECU 52.

The hybrid vehicle 20 of the embodiment provides a parking position (P position) used for parking, a reverse position (R position) for reverse driving, a neutral position (N position) at a neutral gear and a drive position (D position) for forward driving, as the operational position of the shift lever 81 (the shift position SP detected by the shift position sensor 82).

At the shift position SP set to a drive position (D position or R position), the hybrid vehicle 20 of the embodiment having the above configuration is driven in a hybrid drive mode (HV drive mode) accompanied with operation of the engine 22 or in an electric drive mode (EV drive mode) with stop of operation of the engine 22. In the HV drive mode or the EV drive mode, the hybrid assembly (including the engine 22 and the motors MG1 and MG2) and the multi-speed transmission 60 are controlled.

In control of the hybrid assembly in the HV drive mode, the HVECU 70 sets a torque demand Tout* required for the driveshaft 36 (output shaft of the multi-speed transmission 60) based on the accelerator position Acc and the vehicle speed V, calculates a gear ratio Gr of the multi-speed transmission 60 by dividing the rotation speed Nm2 of the motor MG2 (rotation speed of the intermediate shaft 32, i.e., the input shaft of the multi-speed transmission 60) by the rotation speed Nout of the driveshaft 36, and calculates a torque demand Tin* required for the intermediate shaft 32 by dividing the torque demand Tout* of the driveshaft 36 by the gear ratio Gr of the multi-speed transmission 60. The HVECU 70 subsequently calculates a power demand Pin* required for the intermediate shaft 32 by multiplying the torque demand Tin* of the intermediate shaft 32 by the rotation speed Nm2 of the motor MG2 (rotation speed of the intermediate shaft 32), and calculates a power demand Pe* required for the engine 22 by subtracting a charge-discharge power demand Pb* (taking a positive value during discharge from the battery 50) based on the state of charge SOC of the battery 50 from the calculated power demand Pin*. The HVECU 70 then sets a target rotation speed Ne* and a target torque Te* of the engine 22 and torque commands Tm1* and Tm2* of the motors MG1 and MG2 such as to output the power demand Pe* of the engine 22 from the engine 22 and output the torque demand Tin* to the intermediate shaft 32 in a range of the input limit Win and the output limit Wout of the battery 50, and sends the target rotation speed Ne* and the target torque Te* of the engine 22 to the engine ECU 24 while sending the torque commands Tm1* and Tm2* of the motors MG1 and MG2 to the motor ECU 40. When receiving the target rotation speed Ne* and the target torque Te*, the engine ECU 24 performs intake air control, fuel injection control and ignition control of the engine 22 such as to drive the engine 22 based on the target rotation speed Ne* and the target torque Te*. When receiving the torque commands Tm1* and Tm2*, the motor ECU 40 performs switching control of the switching elements of the inverters 41 and 42 to drive the motors MG1 and MG2 with the torque commands Tm1* and Tm2*.

In control of the hybrid assembly in the EV drive mode, the HVECU 70 sets the torque demand Tout* of the driveshaft 36, the gear ratio Gr of the multi-speed transmission 60 and the torque demand Tin* of the intermediate shaft 32 in the same manner as the control in the HV drive mode described above. The HVECU 70 subsequently sets the torque command Tm1* of the motor MG1 to a value 0, sets the torque command Tm2* of the motor MG2 such as to output the torque demand Tin* to the intermediate shaft 32 in the range of the input limit Win and the output limit Wout of the battery 50, and sends the set torque commands Tm1* and Tm2* to the motor ECU 40. When receiving the torque commands Tm1* and Tm2*, the motor ECU 40 performs switching control of the switching elements of the inverters 41 and 42 to drive the motors MG1 and MG2 with the torque commands Tm1* and Tm2*.

In control of the multi-speed transmission 60 at the shift position SP set to the D position, the HVECU 70 first sets the torque demand Tout* required for the driveshaft 36 based on the accelerator position Acc and the vehicle speed V and sets a target speed Gs* of the multi-speed transmission 60 based on the vehicle speed V and the torque demand Tout* of the driveshaft 36 by referring to a change speed map of FIG. 5. In FIG. 5, solid lines "1-2", "2-3" and "3-4" denote upshift lines of the multi-speed transmission 60 (when the vehicle speed V intersects the line rightward at the speed defined by the left numeral or the lower speed, the speed should be shifted up to the speed defined by the right numeral), and broken lines "2-1", "3-2" and "4-3" denote downshift lines of the multi-speed transmission 60 (when the vehicle speed V intersects the line leftward at the speed defined by the left numeral or the higher speed, the speed should be shifted down to the speed defined by the left numeral). After setting the target speed Gs* of the multi-speed transmission 60, the HVECU 70 controls the multi-speed transmission 60 (hydraulic control device) such as to keep the speed of the multi-speed transmission 60 when the current speed of the multi-speed transmission 60 is equal to the target speed Gs*, while controlling the multi-speed transmission 60 to change the speed of the multi-speed transmission 60 to the target speed Gs* when the current speed of the multi-speed transmission 60 is different from the target speed Gs*.

In control of the multi-speed transmission 60 at the shift position SP set to the R position, the HVECU 70 controls the multi-speed transmission 60 to keep the reverse speed.

At the shift position SP set to the N position, the hybrid vehicle 20 of the embodiment performs at least one of an electrical neutral control to provide the neutral state by shutting off the gates of the inverters 41 and 42 (turning off all the switching elements) so as not to output power to the driveshaft 36 and a mechanical neutral control to provide the neutral state by release of the transmission of power between the intermediate shaft 32 and the driveshaft 36 by the multi-speed transmission 60. In the electrical neutral control, the HVECU 70 sends a gate shutoff command of the inverters 41 and 42 to the motor ECU 40, and the motor ECU 40 shuts off the gates of the inverters 41 and 42 in response to the received gate shutoff command. In the mechanical neutral control, the HVECU 70 controls the multi-speed transmission 60 (hydraulic control device) to engage one of the clutches C1 and C2 and the brakes B1 and B2 of the multi-speed transmission 60 and release the other three components. According to the embodiment, at the shift position SP set to the N position, a value 0 is set to the torque demand Tout* of the driveshaft 36, the torque demand Tin* of the intermediate shaft 32, the power demand Pin* of the intermediate shaft 32 and the power demand Pe* of the engine 22, in order to suppress the power from being output from the engine 22.

The following describes the operations of the hybrid vehicle 20 of the embodiment having the above configuration or more specifically the operations in response to a DN operation that changes the shift position SP from the D position to the N position during forward drive in the HV drive mode. FIG. 6 is a flowchart showing one example of N position control routine performed by the HVECU 70 of the embodiment. This routine is repeatedly performed when the shift position SP is set to the N position. As described above, at the shift position SP set to the N position, the power demand Pe* of the engine 22 is set to the value 0. After the DN operation, the power of the engine 22 is accordingly decreased toward the value 0, and the driving state of the engine 22 shifts from a load operation to a non-load operation (autonomous operation).

On the start of the N position control routine, the HVECU 70 first inputs data, for example, the accelerator position Acc from the accelerator pedal position sensor 84, the rotation speed Ne of the engine 22, the rotation speed Nm1 and Nm2 of the motors MG1 and MG2, the rotation speed Nout of the driveshaft 36 from the rotation speed sensor 69, the gear ratio Gr of the multi-speed transmission 60 and a post DN operation time t denoting a time elapsed since the DN operation (step S100). The rotation speed Ne of the engine 22 is input from the engine ECU 24 by communication as the value calculated based on the signal from the crank position sensor 23. The rotation speeds Nm1 and Nm2 of the motors MG1 and MG2 are input from the motor ECU 40 by communication as the values calculated based on the rotational positions of the rotors of the motors MG1 and MG2 from the rotational position detection sensors 43 and 44 and. The gear ratio Gr of the multi-speed transmission 60 is input as the value calculated by dividing the rotation speed Nm2 of the motor MG2 by the rotation speed Nout of the driveshaft 36 from the rotation speed sensor 69. The post DN operation time t is input as a count by a timer (not shown) started in response to the DN operation.

Figure 7:
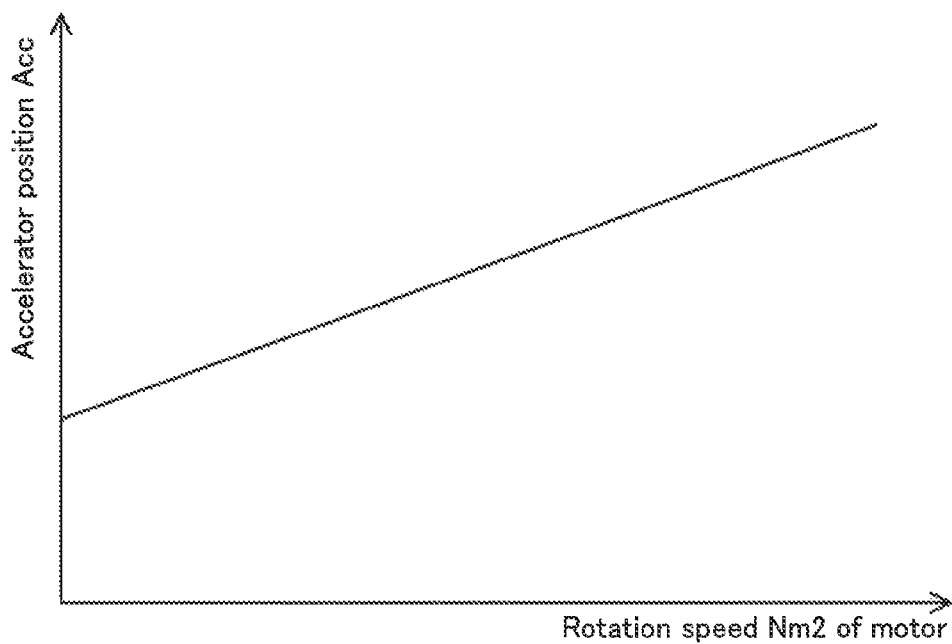
FIG. 7 is one example of the reference accelerator position setting map.

After the data input, the HVECU 70 determines whether it is immediately after the DN operation (first cycle of this routine) (step S110). When it is immediately after the DN operation, the HVECU 70 sets a reference accelerator position Aref based on the rotation speed Nm2 of the motor MG2 (step S120) and compares the accelerator position Acc with the reference accelerator position Aref (step S130). When it is immediately after the DN operation, some power of the engine 22 is expected to remain. In the electrical neutral control, the rotation speed Ne of the engine 22 cannot be controlled by the motor MG1. According to the magnitude of the power of the engine 22, there is accordingly a likelihood that the engine 22 significantly races and the engine 22 or the motor MG1 has overspeed. According to this embodiment, especially the motor MG1 is likely to have overspeed, as clearly understood from the collinear diagram of the planetary gear 30 shown in FIG. 3. The reference accelerator position Aref denotes a threshold value used to determine whether there is such a likelihood. A procedure of the embodiment stores a predefined relationship between the rotation speed Nm2 of the motor MG2 and the reference accelerator position Aref as a reference accelerator position setting map in a ROM (not shown) and reads and sets the reference accelerator position Aref corresponding to the given rotation speed Nm2 of the motor MG2 from the stored map. One example of the reference accelerator position setting map is shown in FIG. 7. As illustrated, the reference accelerator position Aref is set to decrease with a decrease in rotation speed Nm2 of the motor MG2. This setting takes into account that the rotation speed of the motor MG1 increases with a decrease in rotation speed Nm2 of the motor MG2 (rotation speed of the intermediate shaft 32) when the engine 22 is rotated at a certain rotation speed and that the motor MG1 is likely to have overspeed, as clearly understood from the collinear diagram of the planetary gear 30 shown in FIG. 3.

When the accelerator position Acc is less than the reference accelerator position Aref at step S130, the HVECU 70 selects the electrical neutral control between the electrical neutral control and the mechanical neutral control (step S140) and sets an idle rotation speed Nid1 (for example, 1000 rpm or 1200 rpm) of the engine 22 to the target rotation speed Ne* of the engine 22 (step S150). The HVECU 70 subsequently sends the target rotation speed Ne* of the engine 22, an autonomous operation command for the engine 22 and the gate shutoff command of the inverters 41 and 42 (command for performing the electrical neutral control) to the engine ECU 24 and the motor ECU 40 (step S160), sets the target speed Gs* of the multi-speed transmission 60 based on the vehicle speed V (step S170) and controls the multi-speed transmission 60 (hydraulic control device) to set the speed of the multi-speed transmission 60 to the target speed Gs* (step S180), before terminating this routine. When receiving the target rotation speed Ne* and the autonomous control command, the engine ECU 24 controls the engine 22 to be autonomously operated at the target rotation speed Ne*. When receiving the gate shutoff command, the motor ECU 40 shuts off the gates of the inverters 41 and 42 (turns off all the switching elements). The target speed Gs* is set based on the vehicle speed V and the torque demand Tout* (=the value 0) of the driveshaft 36 by referring to the change speed map of FIG. 5.

The electrical neutral control sets the target speed Gs* of the multi-speed transmission 60 as described above and thereby enables the power to be output to the driveshaft 36 by simply resuming the control of the inverters 41 and 42 (terminating the shutoff of the gates). Compared with the mechanical neutral control, this electrical neutral control allows for the quicker power output from the driveshaft 36 (i.e., enhances the output responsiveness), in response to a subsequent ND operation that changes the shift position SP from the N position to the D position.

When the accelerator position Acc is not less than the reference accelerator position Aref at step S130, on the other hand, the HVECU 70 sets the rotation speed Ne of the engine 22 and the rotation speeds Nm1 and Nm2 of the motors MG1 and MG2 input at step S100 to rotation speeds Nedn, Nm1$dn$ and Nm2$dn$ at the time of DN operation (step S190), selects the mechanical neutral control between the electrical neutral control and the mechanical neutral control (step S230) and compares the post DN operation time t with a reference time tref (step S240). The reference time tref is set as a time period from the start of the DN operation to the time when the power of the engine 22 reaches the value 0 (for example, a time period when the power of the engine 22 decreases from the maximum power to the value 0 in response to the DN operation) and is set to, for example, 0.2 seconds, 0.3 seconds or 0.5 seconds.

When it is immediately after the DN operation, the post DN operation time t is less than the reference time tref. The HVECU 70 accordingly sets the rotation speeds Nedn, Nm1$dn$ and Nm2$dn$ at the time of DN operation to the target rotation speed Ne* of the engine 22 and target rotation speeds Nm1* and Nm2* of the motors MG1 an MG2 (step S250), and sets torque commands Tm1* and Tm2* of the motors MG1 and MG2 according to Equations (1) and (2) given below using the set target rotation speeds Nm1* and Nm2* of the motors MG1 and MG2 and the current rotation speeds Nm1 and Nm2 of the motors MG1 and MG2 (step S270). The HVECU 70 sends the target rotation speed Ne* of the engine 22, the autonomous operation command for the engine 22 and the torque commands Tm1* and Tm2* of the motors MG1 and MG2 to the engine ECU 24 and the motor ECU 40 (step S280) and controls the multi-speed transmission 60 (hydraulic control device) to release the transmission of power between the intermediate shaft 32 and the driveshaft 36 in the mechanical neutral control (step S290), before terminating this routine. When receiving the target rotation speed Ne* and the autonomous control command, the engine ECU 24 controls the engine 22 to be autonomously operated at the target rotation speed Ne*. When receiving the torque commands Tm1* and Tm2*, the motor ECU 40 controls the motors MG1 and MG2 to drive the motors MG1 and MG2 with the torque commands Tm1* and Tm2* (i.e., performs switching control of the switching elements of the inverters 41 and 42). Controlling the engine 22 and the motors MG1 and MG2 in this manner causes the engine 22 and the motors MG1 and MG2 to be rotated at the rotation speeds close to the rotation speeds Nedn, Nm1$dn$ and Nm2$dn$ at the time of DN operation. This accordingly suppresses racing of the engine 22 and overspeed of the engine 22 or the motor MG1 (especially overspeed of the motor MG1).

$$Tm1^* = kp1 \cdot (Nm1^* - Nm1) + ki1 \cdot \int (Nm1^* - Nm1) dt \qquad (1)$$

$$Tm2^* = kp2 \cdot (Nm2^* - Nm2) + ki2 \cdot \int (Nm2^* - Nm2) dt \qquad (2)$$

When it is not immediately after the DN operation at step S110, on the other hand, the HVECU 70 determines whether it is under the mechanical neutral control or under the electrical neutral control (step S200). When it is under the electrical neutral control, the HVECU 70 selects the electrical neutral control between the electrical neutral control and the mechanical neutral control (step S140) and performs the processing of steps S150 to S180 described above, before terminating this routine.

Figure 8:
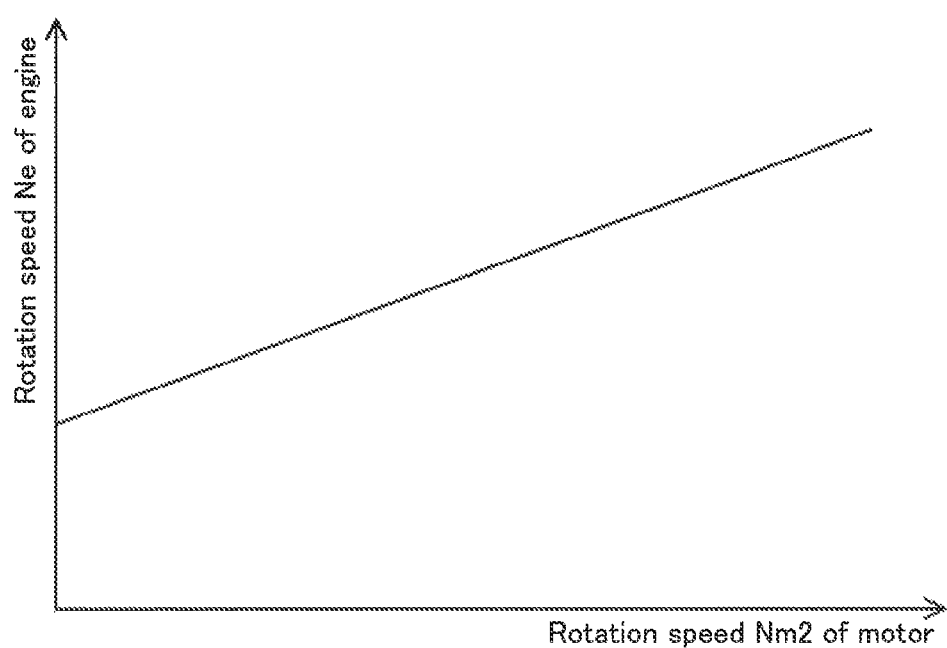
FIG. 8 is one example of the reference rotation speed setting map.

When it is under the mechanical neutral control at step S200, on the other hand, the HVECU 70 sets a reference rotation speed Neref based on the rotation speed Nm2 of the motor MG2 (step S210) and compares the rotation speed Ne of the engine 22 with the reference rotation speed Neref (step S220). The reference rotation speed Neref denotes a threshold value used to determine whether the control should be changed from the mechanical neutral control to the electrical neutral control. A procedure of this embodiment stores a predefined relationship between the rotation speed Nm2 of the motor MG2 and the reference rotation speed Neref as a reference rotation speed setting map in the ROM (not shown) and reads and sets the reference rotation speed Neref corresponding to the given rotation speed Nm2 of the motor MG2 from the stored map. One example of the reference rotation speed setting map is shown in FIG. 8. As illustrated, the reference rotation speed Neref is set to decrease with a decrease in rotation speed Nm2 of the motor MG2. This setting takes into account that the rotation speed of the motor MG1 increases with a decrease in rotation speed Nm2 of the motor MG2 (i.e., rotation speed of the intermediate shaft 32) when the engine 22 is rotated at a certain rotation speed, like the reference accelerator position Aref.

When the rotation speed Ne of the engine 22 is not lower than the reference rotation speed Neref at step S220, the HVECU 70 selects the mechanical neutral control between the electrical neutral control and the mechanical neutral control (step S230) and compares the post DN operation time t with the reference time tref (step S240). When the post DN operation time t is less than the reference time tref, the HVECU 70 performs the processing of step S250 and steps S270 to S290 described above, before terminating this routine. Controlling the engine 22 and the motors MG1 and MG2 in this manner causes the engine 22 and the motors MG1 and MG2 to be rotated at the rotation speeds close to the rotation speeds Nedn, Nm1*dn* and Nm2*dn* at the time of DN operation.

When the post DN operation time t is not less than the reference time tref at step S240, on the other hand, the HVECU 70 sets the idle rotation speed Nid1 of the engine 22 to the target rotation speed Ne* of the engine 22, sets an estimated rotation speed (Nout·Grest) of the intermediate shaft 32 (input shaft of the multi-speed transmission 60), which is obtained by multiplying the rotation speed Nout of the driveshaft 36 by a gear ratio Grest corresponding to an estimated speed Gsest of the multi-speed transmission 60 expected to be provided in response to a changeover to the electrical neutral control or in response to the ND operation, to the target rotation speed Nm2* of the motor MG2, and sets the target rotation speed Nm1* of the motor MG1 by Equation (3) given below using the target rotation speed Ne* of the engine 22, the target rotation speed Nm2* of the motor MG2 and a gear ratio ρ of the planetary gear (number of teeth of the sun gear 30*s*/number of teeth of the ring gear 30*r*) (step S260). The HVECU 70 then performs the processing of steps S270 to S290 described above, before terminating this routine.

$$Nm1^* = Ne^* \cdot (1+\rho)/\rho - Nm2^*/\rho \qquad (3)$$

The estimated speed Gsest of the multi-speed transmission 60 is set based on the vehicle speed V and the torque demand Tout* (=the value 0) of the driveshaft 36 by referring to the change speed map of FIG. 5. Equation (3) is readily led by using the collinear diagram of the planetary gear 30 shown in FIG. 3. Controlling the engine 22 and the motors MG1 and MG2 in this manner changes (decreases) the rotation speed Ne of the engine 22 from the rotation speed Nedn at the time of DN operation toward the idle rotation speed Nid1 and changes the rotation speed Nm2 of the motor MG2 from the rotation speed Nm2*dn* at the time of DN operation toward the estimated rotation speed (Nout·Grest) of the intermediate shaft 32. After the start of the mechanical neutral control, no torque is output to the driveshaft 36, so that the rotation speed Nout of the driveshaft 36 (vehicle speed V) gradually decreases. The estimated rotation speed (Nout·Grest) of the intermediate shaft 32 thus gradually decreases at the estimated speed Gsest fixed to a certain speed and temporarily increases in response to a change of the estimated speed Gsest to a lower speed for the lower vehicle speed. The above reference rotation speed Neref used in this embodiment is a smaller value than an expected rotation speed range as the rotation speed Nedn at the time of DN operation when the accelerator position Acc is not less than the reference accelerator position Aref. This smaller value denotes a value determined in advance by experiment or analysis (value according to the rotation speed Nm2 of the motor MG2 in this embodiment) such as not to decrease the rotation speed Ne lower than the reference rotation speed Neref when the rotation of the engine 22 is close to the rotation speed Nedn at the time of DN operation but such as to change the rotation speed Ne across the reference rotation speed Neref when the rotation of the engine 22 is decreased toward the idle rotation speed Nid1.

When the rotation speed Ne of the engine 22 is lower than the reference rotation speed Neref at step S220, on the other hand, the HVECU 70 selects the electrical neutral control between the electrical neutral control and the mechanical neutral control (step S140) and performs the processing of steps S150 to S180 described above, before terminating this routine. This changes the control from the mechanical neutral control to the electrical neutral control. According to this embodiment, when the rotation speed Ne of the engine 22 is lower than the reference rotation speed Neref, the rotation speed Nm2 of the motor MG2 is made to approach the estimated rotation speed (Nout·Grest) of the intermediate shaft 32 (input shaft of the multi-speed transmission 60). This reduces a potential shock in the course of a change from the mechanical neutral control to the electrical neutral control (i.e., in the course of engagement of part of the clutches C1 and C2 and the brakes B1 and B2 to set the speed of the multi-speed transmission 60 to the target speed Gs*).

When the control is changed from the mechanical neutral control to the electrical neutral control, in a subsequent cycle of this routine, it is not immediately after the DN operation at step S110 and it is under the electrical neutral control at step S200. The HVECU 70 accordingly selects the electrical neutral control between the electrical neutral control and the mechanical neutral control (step S140) and performs the processing of steps S150 to S180 described above, before terminating this routine. In other words, this embodiment does not change the control again to the mechanical neutral control after a change from the mechanical neutral control to the electrical neutral control. This takes into account no likelihood that the engine 22 or the motor MG1 has overspeed since no power is output from the engine 22 at the shift position SP kept to the N position, as well as the output responsiveness to the driveshaft 36 in response to a subsequent ND operation.

Figure 9:
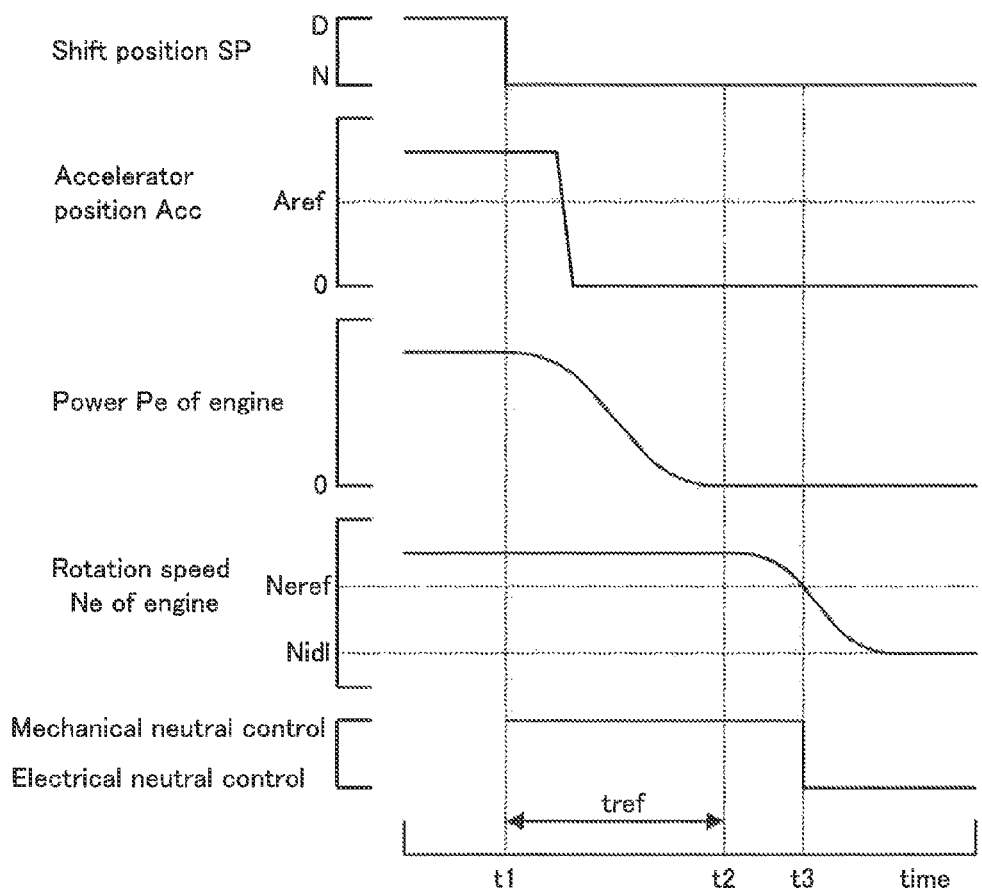
FIG. 9 is a diagram illustrating one example of time changes of power Pe and rotation speed Ne of the engine and neutral control (electrical neutral control or mechanical neutral control) when the accelerator position Acc is not less than the reference accelerator position Aref at the time of a DN operation.

FIG. 9 is a diagram illustrating one example of time changes of power Pe and rotation speed Ne of the engine 22 and neutral control (electrical neutral control or mechanical neutral control) when the accelerator position Acc is not less than the reference accelerator position Aref at the time of a DN operation. As illustrated, at the time of a DN operation (at time t1), when the accelerator position Acc is not less than the reference accelerator position Aref, the mechanical neutral control is performed and the engine 22 is rotated at the rotation speed close to the rotation speed Nedn at the time of DN operation. This suppresses racing of the engine 22 and overspeed of the engine 22 or the motor MG1 (especially overspeed of the motor MG1). When a period of the reference time tref has elapsed since the DN operation (at time t2), the rotation speed Ne of the engine 22 is decreased toward the idle rotation speed Nid1 upon determination that the power Pe of the engine 22 has been decreased to the value 0. When the rotation speed Ne of the engine 22 reaches below the reference rotation speed Neref in the course of the decrease (at time t3), the control is changed from the mechanical neutral control to the electrical neutral control. This allows for quick power output from the driveshaft 36 in a subsequent ND operation.

As described above, in response to the DN operation that changes the shift position SP from the D position to the N position during forward drive in the HV drive mode, when the accelerator position Acc is not less than the reference accelerator position Aref, the hybrid vehicle 20 of the embodiment performs the mechanical neutral control to provide the neutral state by releasing the transmission of power between the intermediate shaft 32 and the driveshaft 36 by the multi-speed transmission 60. The hybrid vehicle 20 then controls the engine 22 and the motors MG1 and MG2 such as to rotate the engine 22 and the motors MG1 and MG2 at the rotation speeds close to the rotation speeds Nedn, Nm1*dn* and Nm2*dn* at the time of DN operation. This suppresses racing of the engine 22 and overspeed of the engine 22 or the motor MG1 (especially overspeed of the motor MG1). When the accelerator position Acc is less than the reference accelerator position Aref, on the other hand, the hybrid vehicle 20 performs the electrical neutral control to provide the neutral state by shutting off the gates of the inverters 41 and 42 and keeps the multi-speed transmission 60 in the condition that allows for transmission of power between the intermediate shaft 32 and the driveshaft 36. This enables the power to be output to the driveshaft 36 by simply resuming the control of the inverters 41 and 42 (terminating the shutoff of the gates). This also allows for quick power output from the driveshaft 36 (i.e., enhances the output responsiveness), in response to a subsequent ND operation that changes the shift position SP from the N position to the D position.

The hybrid vehicle 20 of the embodiment determines whether either the mechanical neutral control or the electrical neutral control should be performed in response to the DN operation, based on the accelerator position Acc at the time of the DN operation (i.e., the accelerator position Acc immediately before the DN operation). The determination may be based on, instead of the accelerator position Acc, any of the torque demand Tout* of the driveshaft 36 based on the accelerator position Acc, a power demand Pout* of the driveshaft 36 calculated by multiplying the torque demand Tout* by the rotation speed Nout of the driveshaft 36, the torque demand Tin* of the intermediate shaft 32 calculated by dividing the torque demand Tout* by the gear ratio Gr of the multi-speed transmission 60, the power demand Pin* of the intermediate shaft 32 calculated by multiplying the torque demand Tin* by the rotation speed Nm2 of the motor MG2 (i.e., the rotation speed of the intermediate shaft 32), the power demand Pe* of the engine 22 based on the power demand Pin* and the charge-discharge power demand Pb* of the high voltage battery 50, the torque and the power output from the engine 22 and the amount of intake air or the amount of fuel injection of the engine 22. The parameter such as the accelerator position Acc or the torque demand Tout* (parameter relating to output of the engine 22) and the output of the engine 22 have the relationship such that the output of the engine 22 increases with an increase in parameter or the parameter increases with an increase in output of the engine 22.

The hybrid vehicle 20 of the embodiment sets the reference accelerator position Aref such as to decrease with a decrease in rotation speed Nm2 of the motor MG2 (rotation speed of the intermediate shaft 32), but the reference accelerator position Aref may be a fixed value.

The hybrid vehicle 20 of the embodiment sets the reference rotation speed Nref such as to decrease with a decrease in rotation speed Nm2 of the motor MG2 (rotation speed of the intermediate shaft 32), but the reference rotation speed Nref may be a fixed value.

In the mechanical neutral control, when the post DN operation time t is less than the reference time tref, the hybrid vehicle 20 of the embodiment controls the engine 22 and the motors MG1 and MG2 to rotate the engine 22 and the motors MG1 and MG2 at the rotation speeds close to the rotation speeds Nedn, Nm1dn and Nm2dn at the time of DN operation. When the post DN operation time t is not less than the reference time tref, on the other hand, the hybrid vehicle 20 controls the engine 22 and the motors MG1 and MG2 to change the rotation speed Ne of the engine 22 from the rotation speed Nedn at the time of DN operation toward the idle rotation speed Nid1 and change the rotation speed Nm2 of the motor MG2 from the rotation speed Nm2dn at the time of DN operation toward the estimated rotation speed (Nout·Grest) of the intermediate shaft 32 (input shaft of the multi-speed transmission 60). One modification may control the engine 22 and the motors MG1 and MG2 to rotate the engine 22 and the motors MG1 and MG2 at the rotation speeds close to the rotation speeds Nedn, Nm1dn and Nm2dn at the time of DN operation, irrespective of the post DN operation time t. Another modification may control the engine 22 and the motors MG1 and MG2 to make the rotation speed Ne of the engine 22 approach the idle rotation speed Nid1 and make the rotation speed Nm2 of the motor MG2 approach the estimated rotation speed (Nout·Grest) of the intermediate shaft 32, irrespective of the post DN operation time t. These controls are, however, not restrictive, and any other suitable control of the engine 22 and the motors MG1 and MG2 may be performed to suppress an increase in rotation speed of the engine 22 and an increase in rotation speed of the motor MG1.

The hybrid vehicle 20 of the embodiment changes the control from the mechanical neutral control to the electrical neutral control when the rotation speed Ne of the engine 22 reaches below the reference rotation speed Nref during the mechanical neutral control. One modification may change the control from the mechanical neutral control to the electrical neutral control when the post DN operation time t reaches or exceeds the reference time tref (when the power Pe of the engine 22 has been decreased to the value 0). Another modification may not change the control from the mechanical neutral control to the electrical neutral control, irrespective of the rotation speed Ne of the engine 22.

The above embodiment describes the operations of the hybrid vehicle 20 in response to the DN operation during forward drive in the HV drive mode. More specifically, the hybrid vehicle 20 performs the mechanical neutral control when the accelerator position Acc is not less than the reference accelerator position Aref, while performing the electrical neutral control when the accelerator position Acc is less than the reference accelerator position Aref. One modification may perform the electrical neutral control irrespective of the accelerator position Acc, in response to a DN operation during forward drive accompanied with an autonomous operation or operation stop of the engine 22. This is because the electrical neutral control under the condition of the large accelerator position Acc makes it unlikely that the engine 22 or the motor MG1 has overspeed during the autonomous operation or operation stop of the engine 22.

The above embodiment describes the operations of the hybrid vehicle 20 in response to the DN operation. The description of the embodiment is also applicable to an RN operation that changes the shift position SP from the R position to the N position during reverse drive. The following specification is assumed here: an allowable upper limit vehicle speed at a change of the shift position SP through the N position to the R position during forward drive is lower than the "1-2" line in the change speed map of FIG. 5; and the forward first speed is provided when the shift position SP is changed through the N position to the D position during reverse drive. In the embodiment, the forward first speed and the reverse speed are provided by engagement of the same engagement elements (clutch C1 and brake B2) as described above. The electrical neutral control is performed (to keep the engagement of the clutch C1 and the brake B2 in the multi-speed transmission 60) in response to a DN operation or an RN operation under the condition of the relatively small accelerator position Acc in the state that the multi-speed transmission 60 provides the forward first speed or the reverse speed. In this case, this specification allows for quick power output to the driveshaft 36 in response to a subsequent change of the shift position SP to either the D position or the R position. As a result, this specification ensures the high responsiveness to a change of the shift position SP from the D position through the N position to the R position or a change of the shift position SP from the R position through the N position to the D position under the condition of the relatively small accelerator position Acc, for example, at the time of parking in a garage.

The hybrid vehicle 20 of the embodiment employs the four-speed transmission for the multi-speed transmission 60, but may use a three-speed transmission, a five-speed transmission, a six-speed transmission or the like.

Figure 10:
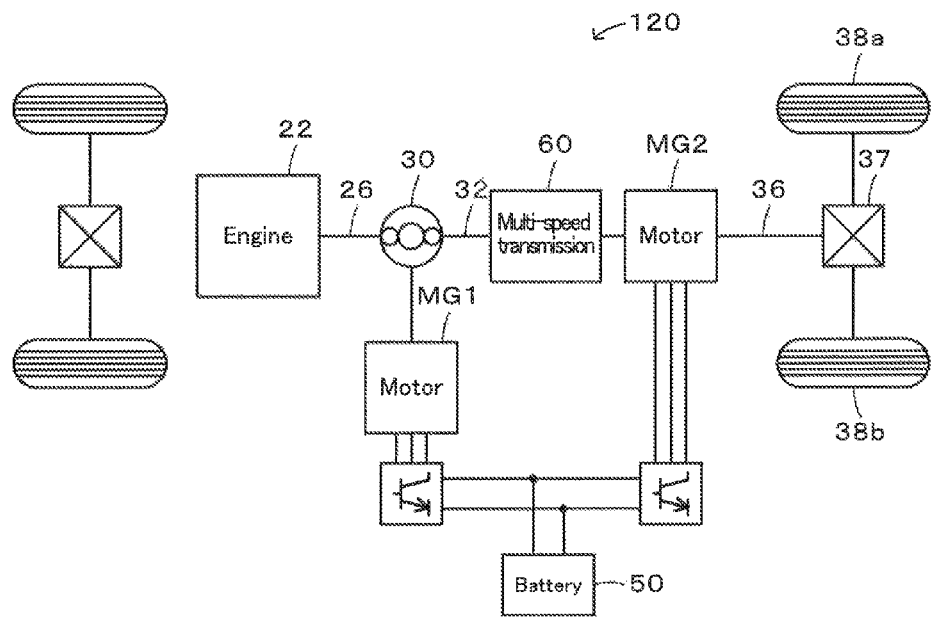
FIG. 10 is a configuration diagram illustrating the schematic configuration of a hybrid vehicle 120 of a modification.
Figure 11:
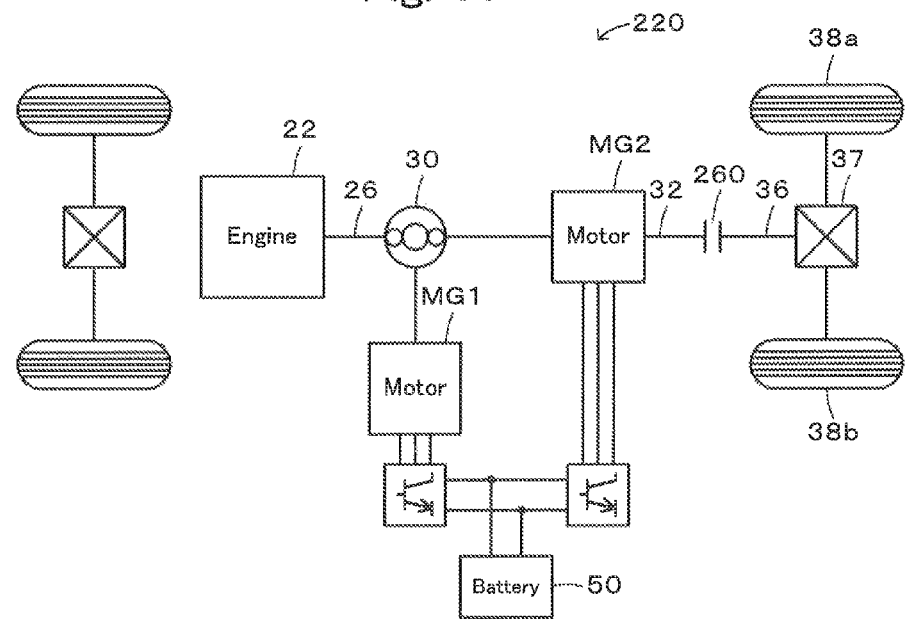
FIG. 11 is a configuration diagram illustrating the schematic configuration of a hybrid vehicle 220 of another modification.
Figure 12:
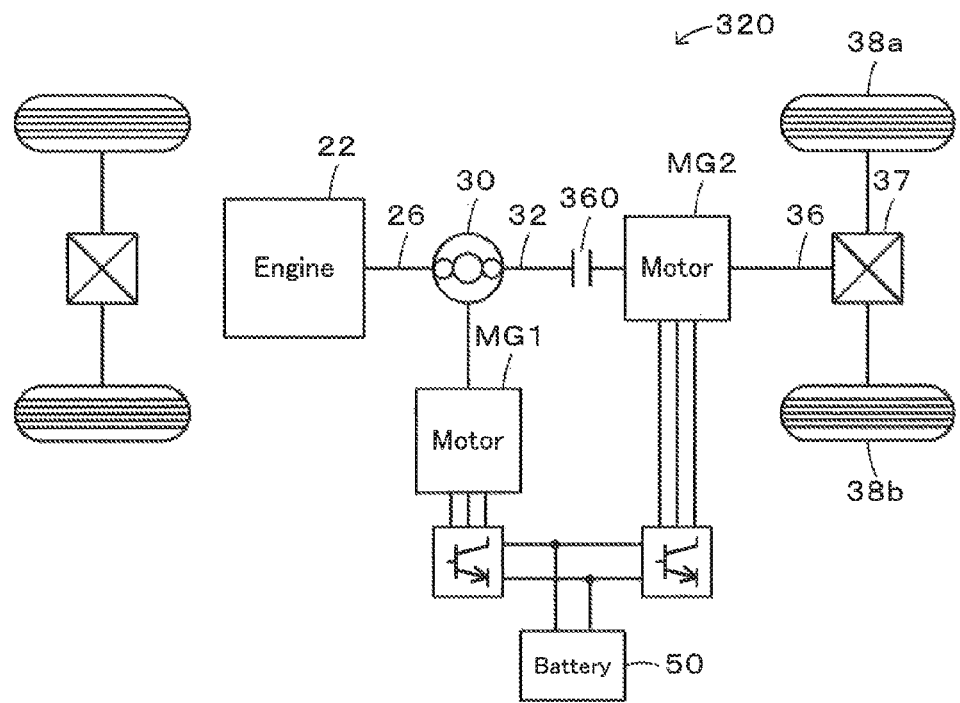
FIG. 12 is a configuration diagram illustrating the schematic configuration of a hybrid vehicle 320 of another modification.

In the hybrid vehicle 20 of the embodiment, the multi-speed transmission 60 is placed between the intermediate shaft 32 and the driveshaft 36, and the motor MG2 is connected with the intermediate shaft 32. As illustrated in a hybrid vehicle 120 of a modification of FIG. 10, the multi-speed transmission 60 may be placed between the intermediate shaft 32 and the driveshaft 36, and the motor MG2 may be connected with the driveshaft 36. As illustrated in a hybrid vehicle 220 of another modification of FIG. 11, a clutch 260 may be placed between the intermediate shaft 32 and the driveshaft 36, and the motor MG2 may be connected with the intermediate shaft 32. As illustrating in a hybrid vehicle 320 of another modification of FIG. 12, a clutch 360 may be placed between the intermediate shaft 32 and the drive shaft 36, and the motor MG2 may be connected with the driveshaft 36.

Figure 13:
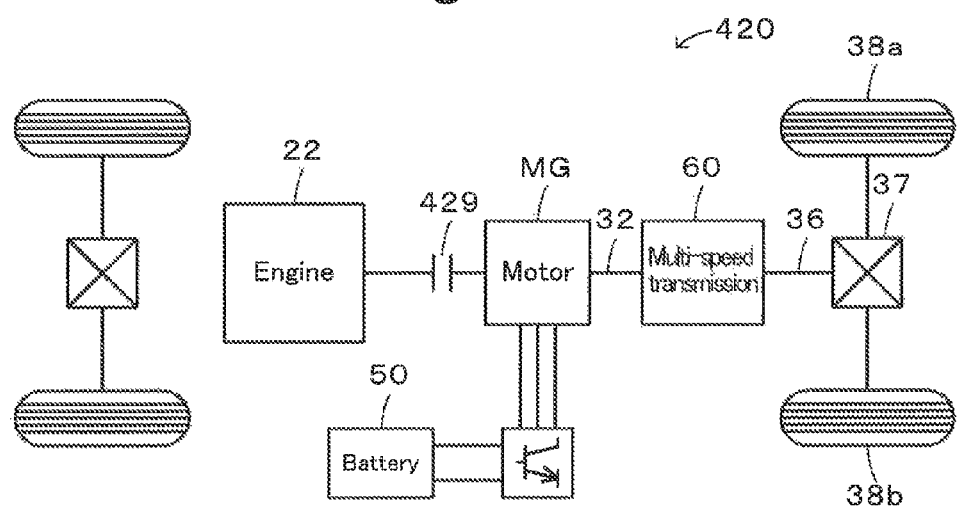
FIG. 13 is a configuration diagram illustrating the schematic configuration of a hybrid vehicle 420 of another modification.

In the hybrid vehicle 20 of the embodiment, the power of the engine 22 is output to the intermediate shaft 32 (input shaft of the multi-speed transmission 60) via the planetary gear 30, and the power of the motor MG2 is output to the intermediate shaft 32. As illustrated in a hybrid vehicle 420 of another modification of FIG. 13, a motor MG may be connected with the intermediate shaft 32, and the engine 22 may be connected with a rotating shaft of the motor MG via a clutch 429. The power of the engine 22 may be output to the driveshaft 36 via the rotating shaft of the motor MG and the multi-speed transmission 60, and the power of the motor MG may be output to the driveshaft 36 via the multi-speed transmission 60. In this configuration, during the mechanical neutral control, the clutch 429 may be set on, in order to suppress overspeed of the engine 22 or the motor MG by means of the motor MG. During the electrical neutral control, the clutch 429 may be set off, in order to mechanically disconnect the engine 22 from the driveshaft 36.

Figure 14:
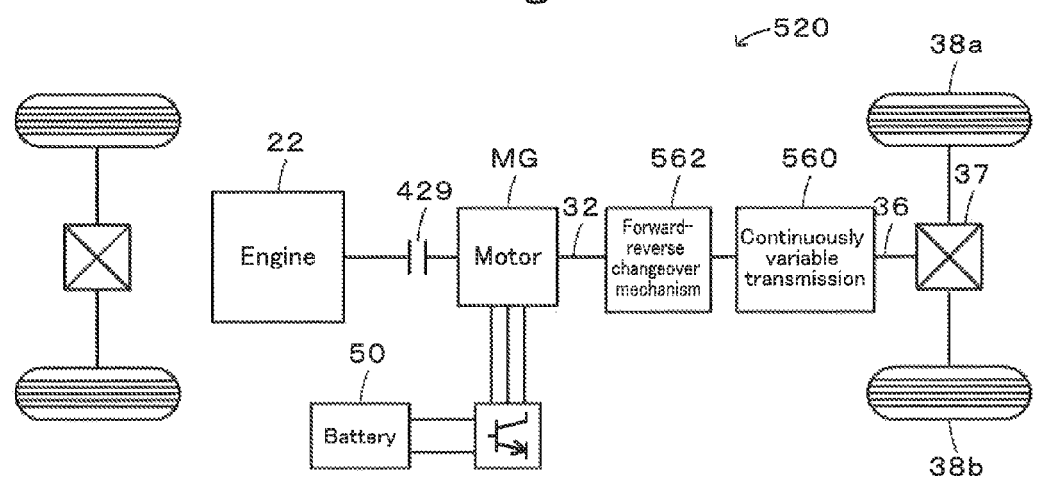
FIG. 14 is a configuration diagram illustrating the schematic configuration of a hybrid vehicle 520 of another modification.

In the hybrid vehicle 20 of the embodiment, the multi-speed transmission 60 is placed between the intermediate shaft 32 and the driveshaft 36. As illustrated in a hybrid vehicle 520 of another modification of FIG. 14, a continuously variable transmission 560 and a forward-reverse changeover mechanism 562 having engagement elements may be placed between the intermediate shaft 32 and the driveshaft 36. In this configuration, the mechanical neutral control may be performed by releasing the engagement elements of the forward-reverse changeover mechanism 562. The configuration of FIG. 14 replaces the multi-speed transmission 60 of the hybrid vehicle 420 of FIG. 13 with the continuously variable transmission 560 and the forward-reverse changeover mechanism 562. The multi-speed transmission 60 in the hybrid vehicle 20 of FIG. 1 or in the hybrid vehicle 120 of FIG. 10 may alternatively be replaced with the continuously variable transmission 560 and the forward-reverse changeover mechanism 562.

The following describes the correspondence relationship between the primary components of the embodiment and the primary components of the invention described in Solution to Problem. The engine 22 of the embodiment corresponds to the "engine", the motor MG1 corresponds to the "motor", the inverter 41 corresponds to the "inverter", the battery 50 corresponds to the "battery", and the multi-speed transmission 60 corresponds to the "power transmission assembly". The HVECU 70 performing the N position control routine of FIG. 6, the engine ECU 24 controlling the engine 22 in response to a command from the HVECU 70 and the motor ECU controlling the motor MG1 (inverter 41) in response to a command from the HVECU 70 correspond to the "controller".

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2014-110322 filed May 28, 2014 including specification, drawings and claims is incorporated herein by reference in its entirety.

The invention claimed is:

1. A hybrid vehicle, comprising an engine configured to output power to an intermediate shaft; a motor configured to input and output power from and to the intermediate shaft; an inverter configured to drive the motor; a battery configured to transmit electric power to and from the motor via the inverter; and a power transmission assembly configured to mechanically transmit power between the intermediate shaft and a driveshaft linked with an axle and mechanically release the transmission of power, the hybrid vehicle further comprising a controller configured to perform at least one of an electrical neutral control that provides a neutral state by shutting off a gate of the inverter and a mechanical neutral control that provides the neutral state by releasing the transmission of the power between the intermediate shaft and the driveshaft by the power transmission assembly, at a shift position set to a neutral position, wherein in response to a neutral operation that changes the shift position from a drive position to the neutral position, the controller performs the mechanical neutral control when a parameter relating to output of the engine is equal to or greater than a reference value, while performing the electrical neutral control when the parameter is less than the reference value.

2. The hybrid vehicle according to claim 1,
wherein when a rotation speed of the engine decreases to or below a reference rotation speed during the mechanical neutral control performed in response to the neutral operation, the controller changes control from the mechanical neutral control to the electrical neutral control.

3. The hybrid vehicle according to claim 1, further comprising:
a planetary gear configured to have three rotational elements respectively connected with an output shaft of the engine, a rotating shaft of the motor and the intermediate shaft;
a second motor configured to input and output power from and to the driveshaft;
a second inverter configured to drive the second motor, wherein
the battery is configured to transmit electric power to and from the motor via the inverter and transmit electric power to and from the second motor via the second inverter, and
the controller performs the electrical neutral control to provide the neutral state by shutting off the gate of the inverter and a gate of the second inverter.

4. The hybrid vehicle according to claim 3,
wherein the reference value is set to decrease with a decrease in rotation speed of the intermediate shaft.

5. The hybrid vehicle according to claim 3,
wherein when a rotation speed of the engine decreases to or below a reference rotation speed during the mechanical neutral control performed in response to the neutral operation, the controller changes control from the mechanical neutral control to the electrical neutral control, and
the reference rotation speed is set to decrease with a decrease in rotation speed of the intermediate shaft.

6. The hybrid vehicle according to claim 1,
wherein the controller performs the mechanical neutral control to control the engine and the motor to be driven at rotation speeds at a time of the neutral operation.

7. The hybrid vehicle according to claim 6,
wherein after elapse of a predetermined time since start of the mechanical neutral control, the controller performs a control to cause the engine to rotate at an idle rotation speed and cause a rotation speed of the intermediate shaft to approach a rotation speed estimated in a state that allows for transmission of power between the intermediate shaft and the driveshaft by the power transmission assembly.

8. The hybrid vehicle according to claim 1,
wherein the power transmission assembly comprises a multi-speed transmission configured to have engagement elements and placed between the intermediate shaft and the driveshaft.

\* \* \* \* \*